United States Patent Office 3,556,914
Patented Jan. 19, 1971

3,556,914
COMPOSITE METAL FIBER AND PLASTIC STRUCTURES AND METHOD OF PRODUCING THE SAME
Appy Juras, Chicago, Ill., assignor to University Patents, Inc. of Illinois, Chicago, Ill., a corporation of Illinois
No Drawing. Continuation-in-part of application Ser. No. 292,142, July 1, 1963. This application May 9, 1967, Ser. No. 637,085
The portion of the term of the patent subsequent to Dec. 5, 1984, has been disclaimed
Int. Cl. B29j 5/00; B44f 1/04
U.S. Cl. 161—5
10 Claims

ABSTRACT OF THE DISCLOSURE

A composite metal fiber-plastic structure wherein the metal fiber is anodized, color coated metal, particularly aluminum. The fibers themselves are composite sandwich members having exposed metal on all four sides thereof. Such composite fibers are felted and non-metallurgically bonded after which the interstices may be filled with plastic to form a non-porous structure or the pores may be left unfilled to provide a porous, plastic bonded skeleton. Rigid or flexible sheet materials may be readily made.

CROSS-REFERENCES TO RELATED APPLICATIONS

This application is a continuation-in-part of the pending application Ser. No. 292,142 entitled "Colored Fiber Metal Structures and Method of Making Same" filed July 1, 1963 and now Pat. No. 3,356,559.

BACKGROUND OF THE INVENTION

Field of the invention

This invention relates to novel fibrous materials of construction and to the method of their manufacture and more particularly relates to a fibrous skeletal materials fabricated of anodized, colored metal fibers in combination with various plastic materials. Accordingly the fibers themselves are composite structures consisting of a metal inner layer sandwiched between opposed anodized and colored surfaces thereon. Moreover, the fibers are essentially rectangular in cross-section and thus have an exposed metal layer edge on all four sides thereof. Additionally, the fibers have a length of between 0.001 and 2 inches and have a length to mean dimension in cross-section ratio of greater than ten to one.

The resulting metal fiber and plastic components are characterized not only by a strikingly beautiful appearance but are further characterized by excellent abrasion resistance and good thermal and electrical conductivity. Such structures find utility as flooring materials, kitchen counter tops where for example hot pans may be directly placed without fear of burning or charring, furniture, and a plurality of other structural materials all of which I am sure will be evident to those skilled in the art as the description proceeds.

The present fibers may be combined with a multitude of either thermoplastic or thermosetting resins to form these desirable new materials of construction.

The fibers used herewith are preferably made by cutting anodized colored aluminum foils although other anodized, colored metals may be used. The fibers are either felted into a structural mat and then either fully or partially impregnated with the plastic or in the alternative, may be losely dispersed in the plastic.

Accordingly, one embodiment of my invention is directed to a felted, non-metallurgically bonded compact formed of the foregoing composite metal fibers. In another embodiment, such compacts are but partially impregnated with a thermoplastic or thermosetting plastic to provide a felted porous structure, whereas in another embodiment the pores of the felt are completely filled with the impregnating plastic. In still another embodiment, nonfelted, substantially individual, discrete, composite fibers are employed to reinforce various plastics. In yet another embodiment, such fibers are used as a surface treatment for various substrate materials especially transparent substrates.

Description of the prior art

The art most pertinent to this invention of which I am aware are several of my patents directed to the combination of metal fibers and plastic. One of such patents is U.S. 3,184,368 "Metal Fiber Containing Structures and Method Therefor" which is directed to the use of metal fibers which are completely coated with a synthetic resin. Another of said patents is U.S. 3,041,131 "Composite Plastic-Metal Fiber Articles and Method for Making Same" which is primarily directed to plastic reinforced tooling. None of these references disclose the use of the present composite, anodized colored fibers with the attendant benefits thereof.

SUMMARY OF THE INVENTION

The fibers employed in the various embodiments of this invention are in and of themselves composite structures. They are substantially rectangular in cross section and the substrate metal structure is sandwiched between anodized color coated surfaces. The fibers are preferably fabricated by being cut from foil or the like. These foils preferably consist of a thin aluminum sheet about 0.0007" thick having an anodized and colored coating surface on opposed faces thereof. The foils or sheets may range in thickness from about 0.0002 to 0.062 inch. To prepare the fibers such foils are preferably stacked in laminates approximately 1" high for passage across the face of a rotating saw for reduction to the desired fiber size. The fibers may also be chopped or broached from the laminate stack. In one embodiment thereof the fibers are bonded to each other by plastic substances and are in the form of a felted porous mat. Other embodiments of my invention are directed to the reinforcement and alteration of plastic materials either by the infiltration of the porous compacts with plastic materials or by depositing such fibers on the surface of a plastic sheet or flexible film.

It also should by appreciated that in the manufacture of the fibers for use herein it is feasible to employ a practically unlimited number of colors in stack. By this means a well mixed composite of many different fiber colors may be readily obtained.

DESCRIPTION OF THE PREFERRED EMBODIMENTS

Before proceeding with a further description of the invention, we should first consider what is meant by the term "fiber" as employed in the present specification and claims.

By this is meant a relatively short length elongated metal structure which has a length to mean dimension in cross section ratio of greater than 10 to 1. The term "mean dimension in cross section" is related to the shape of the fiber in cross section and refers to one-half of the sum of the short side and the long side of the rectangle. Generally speaking, the fibers that are most useful in the practice of my invention insofar as their length is concerned fall intermediate the metal powders on the one hand and the relatively long length metal filaments which are employed in the metallic wool art. The critical aspect of fiber length and also to a lesser extent mean dimension in cross section is that the fibers be of such size as to be feltable into a substantially uniform three dimensional porous mass.

This uniform feltability feature, along with relatively porous resulting structures, are the chief distinguishing features of fiber metal compacts over both the metal powdered and the metal wools. Uniform bodies have been fabricated from metal powders but of necessity these must be quite dense—at a minimum 48% dense—in order to have individual powder grains in contact and with bondable to joining granular members. The long length filaments of the metal wools on the other hand are not feltable into a uniform body. A large degree of porosity is possible but the filaments comprising metal wools, while overlapping and enmeshed, are still substantially oriented in the direction of filament length. Additionally the wools because of bridging effects and the like are not uniformly porous.

Thus feltability is the critical aspect when one considers the size of the fibers for use in the practice of my invention. Particularly good results in fabricating the hereinafter described and claimed composite structures have been achieved with fibers ⅛ to 3/16" long and a mean dimension in cross section of 0.0007". Fiber lengths and cross sectional dimensions for these materials which have utility with my invention range from 0.001 to 2" and from 0.0001 to 0.1" respectively.

The plastic material which may be employed in conjunction with the composite fibers to form either porous or non-porous compacts generally may either be of the thermoplastic or thermosetting variety although it is preferred that they be of a thermosetting nature. Furthermore, in order to more fully exhibit the inherent stereoscopic beauty of the colored fiber compacts, I prefer to employ colorless or translucent plastics as the void filling agent or backing member although it will be understood that at the option of the user colored plastics may also be so employed. While substantially all plastics may be used, the following may be named for purposes of example:

Thermosetting; epoxy resins, polyester, phenol-formaldehyde resins, urea formaldehyde resins, melamine and furane-furfural resins.

Thermoplastics: polystyrene, vinyl resins, polyurethane, nylon, Mylar, polythenes, e.g., polyethylene, and polypropylene and butyrate resins.

My invention may be further understood by reference to the accompanying examples which are submitted for the purposes of illustration.

EXAMPLE I

Preparation of composite fibers

Sheets of anodized, blue colored aluminum foil were stacked into 1" high laminates. Each foil consisted of composite of about 0.0007" thick. This anodized foil was purchased. The laminates were held together in a jig and reduced to fibers ⅜" long by 0.0007" thick by a circular saw at right angles to their major dimension by repeatedly being passed against the saw blade. As the cutting took place the laminates separated and the individual fibers could then be collected in a bin beneath the saw. In the following examples these fibers and fibers of other colors were employed.

EXAMPLE II

Formation of a non-metallurgically bonded fiber metal compact

The composite fibers were sifted to remove relatively finer material after which they were felted into a three dimensional compact in a molding form. By the interlacing of the fibers a modest degree of green strength is achieved but one must exercise due caution in handling the compacts. It is preferred that the fibers be moderately kinked or curled, a somewhat natural result of sawing, in order that the contact between individual fibers be better secured and thus the green strength of the compact improved. Such fibers normally have a very minute amount of oil on their surfaces which causes some degree of adherence in their non-bonded state. The oil results from the machining into fibers. If such oil is not present almost any non-reactive wetting agent such as glycerine can be employed to assist in the green state inter-fiber adherence. The fibers may be felted through air into the mold form or from a slurry, as for example from a glycerine or water carrier member.

The fibers of the green felted compacts are then non-metallurgically bonded. This can be most readily accomplished by pouring or spraying (air-hydraulic or electrostatic methods) small amounts of uncured liquid resin into the compact whereby capillary attraction will retain the liquid on the fibers followed by curing of the resin to set it and thus bond the fibers one to another at their respective points of contact.

EXAMPLE III

Formation of a non-metallurgically bonded fiber metal compact

The composite color coated fibers were fabricated as taught above. A mixture of such fibers and liquid uncured epoxy resin was gunned into a forming mold to felt and interlock the fibers. The resin was then cured to provide a non-metallurgically bonded compact.

EXAMPLE IV

Plastic impregnation

The bonded compact was fabricated as discussed above. Catalyzed liquid epoxy resin, that is uncured was vacuum impregnated into the compact. The resin was then cured.

With thermoplastic, the resin is first melted and then either poured into or vacuum impregnated into the compact. Mere cooling permits the resin to set.

EXAMPLE V

Plastic reinforcement

The colored fibers in this case are not bonded at all but are merely randomly distributed throughout the plastic mass. A loose mass of fibers are impregnated with for example uncured epoxy and the resin is then cured to harden.

EXAMPLE VI

Sheet materials

The fibers are flocked onto a multitude of substrate members including for example Lucite sheets or plywood. To accomplish this practically any adhesive may be spread on the surface to be coated after which the fibers are sprayed thereon. In addition, if a plastic substrate is used chemicals such as acetone or methyl ethyl ketone may be employed to assist in bonding the composite fibers to the substrate. In this latter instance the substrate is very minutely and temporarily dissolved to form a locus for fiber attachment.

EXAMPLE VII

Colored flexible sheets

In this instance the fibers are deposited on a sheet substrate of for example clear, tacky, pressure sensitive cellophane. I have employed "Scotch tape" sheet materials for this purpose. The amount of fibers that can be deposited in this manner is substantially controlled by the area of mastic surface available for the fibers to adhere to. Thus very thin, attractive coatings can be so made.

EXAMPLE VIII

Sandwich structures

The fibers are first deposited as illustrated in Example VII. Upon the fiber face is then superimposed another sheet of tacky cellophane, tacky side facing the fibers. A very attractive sheet material results.

EXAMPLE IX

Multicolored threads

The sandwich structures resulting from Example VIII are slit into threads. Such thread may be woven into fabrics or used as components thereof.

It will be understood that while the foregoing examples are directed to the use of aluminum fibers, fibers of other metals may be similarly employed.

It will be understood that various modifications and variations may be effected without departing from the spirit or scope of the novel concepts of my invention.

I claim as my invention:

1. A non-porous composite metal fiber-plastic structure comprising:
   a felted mass of metal fibers, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches;
   (d) a length to mean dimension in cross section ratio greater than ten to one,
   said felted mass of fibers having the interstices thereof filled with a plastic material.

2. The non-porous metal fiber-plastic structure as defined in claim 1, wherein said metal fibers are of metal selected from the group consisting of copper, iron, steel, stainless steel and aluminum.

3. A porous composite metal fiber-plastic structure comprising:
   a felted mass of metal fibers, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches;
   (d) a length to mean dimension in cross section ratio greater than ten to one,
   said felted mass of fibers being bonded together at points of fiber contact by means of a plastic material.

4. The porous composite metal fiber-plastic structure as defined in claim 3, wherein said metal fibers are of metal selected from the group consisting of copper, iron, steel, stainless steel and aluminum.

5. A solid, non-porous metal fiber reinforced plastic structure comprising in combination:
   a plastic matrix enmeshing a plurality of individual, discrete metal fibers, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches; and
   (d) a length to mean dimension in cross section ratio greater than ten to one.

6. A composite structure comprising in combination:
   a substrate sheet member having a fibrous coating layer adherent thereon, said coating member consisting essentially of a felted mass of metal fibers, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches; and
   (d) a length to mean dimension in cross section ratio greater than ten to one.

7. The composite structure as defined in claim 6 wherein said substrate member is flexible.

8. A composite structure comprising in combination:
   a felted mass of metal fibers sandwiched between a pair of transparent sheet members, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches;
   (d) a length to mean dimension in cross section ratio greater than ten to one,
   said melted mass of metal fibers being bonded at points of fiber contact by a plastic means.

9. The method of making an article of manufacture which comprises the steps of: felting a plurality of metal fibers into a felt-like structure, each of said fibers being in itself a composite structure having an anodized color coating on each of the two opposed principal surfaces thereof, each of said fibers being further characterized by
   (a) having essentially a rectangular shape;
   (b) an exposed metal layer edge on all four side edges thereof;
   (c) a length of between 0.001 and 2 inches;
   (d) a length to mean dimension in cross section ratio greater than ten to one,
   and bonding said fibers to each other at their respective points of contact by a plastic substance.

10. The method as defined in claim 9 wherein the resulting felted porous structure is impregnated with a plastic substance to fill the interstices thereof.

References Cited

UNITED STATES PATENTS

| | | |
|---|---|---|
| 2,081,538 | 5/1937 | Hoarle. |
| 2,129,504 | 8/1938 | Prindle et al. |
| 2,714,569 | 8/1955 | Prindle et al. |
| 2,889,233 | 6/1959 | Steffey _____ 161—Metal Foil |
| 2,901,455 | 8/1959 | Jurras. |
| 3,041,131 | 6/1962 | Juras et al. |
| 3,053,713 | 9/1962 | Juras. |
| 3,184,368 | 5/1965 | Juras. |
| 3,284,321 | 11/1966 | Fromson _____ 204—18X |
| 3,356,559 | 12/1967 | Juras _____ 161—159X |
| 3,450,606 | 6/1969 | Darrow _____ 204—18 |

FOREIGN PATENTS

| | | |
|---|---|---|
| 889,583 | 2/1962 | Great Britain. |

ROBERT F. BURNETT, Primary Examiner

R. L. MAY, Assistant Examiner

U.S. Cl. X.R.

156—62.4, 250; 161—157, 170, 176; 204—18